United States Patent
Zirin et al.

(10) Patent No.: US 8,177,455 B2
(45) Date of Patent: May 15, 2012

(54) QUICK CONNECT LOBED FASTENER SYSTEM

(75) Inventors: Robert Michael Zirin, Niskayuna, NY (US); Philip Paul Beauchamp, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 934 days.

(21) Appl. No.: 11/530,179

(22) Filed: Sep. 8, 2006

(65) Prior Publication Data

US 2008/0078862 A1    Apr. 3, 2008

(51) Int. Cl.
*F16B 21/02*    (2006.01)
(52) U.S. Cl. ......................... 403/348; 403/349
(58) Field of Classification Search .......... 403/348–353; 411/349, 549, 553; 285/376
See application file for complete search history.

(56) References Cited

U.S. PATENT DOCUMENTS

| 4,527,745 | A | 7/1985 | Butterfield et al. |
| 7,537,409 | B2 * | 5/2009 | Huhnerbein ................. 403/348 |
| 2005/0079010 | A1 | 4/2005 | Droppleman |

FOREIGN PATENT DOCUMENTS

| CN | 2342159 | 10/1999 |
| WO | WO2005083273 A1 | 9/2005 |
| WO | WO 2006042564 A1 * | 4/2006 |

OTHER PUBLICATIONS

State Intellectual Property Office, P.R. China, English Translation of Second Office Action issued on Aug. 11, 2010, pp. 1-11.

* cited by examiner

*Primary Examiner* — Victor MacArthur
(74) *Attorney, Agent, or Firm* — Richard A. Decristofaro

(57) ABSTRACT

A connector for a bracket including a male adapter and a female adapter is provided. The male adapter includes a first base structure and a neck structure protruding out of the base structure and is disposed on a surface to be clamped. The neck structure includes multiple first lobes extending radially outward from the neck structure. The first lobes include a first mating surface contour on a bottom surface. The female adapter includes a second base structure. The second base structure includes multiple second lobes made of a flexible material. The second base structure also includes a second mating surface contour on a top surface and is configured to fit into said first mating surface contour thereby deforming said multiple second lobes to induce a clamping force between a shoulder of said female adapter and a surface of a bracket.

11 Claims, 6 Drawing Sheets

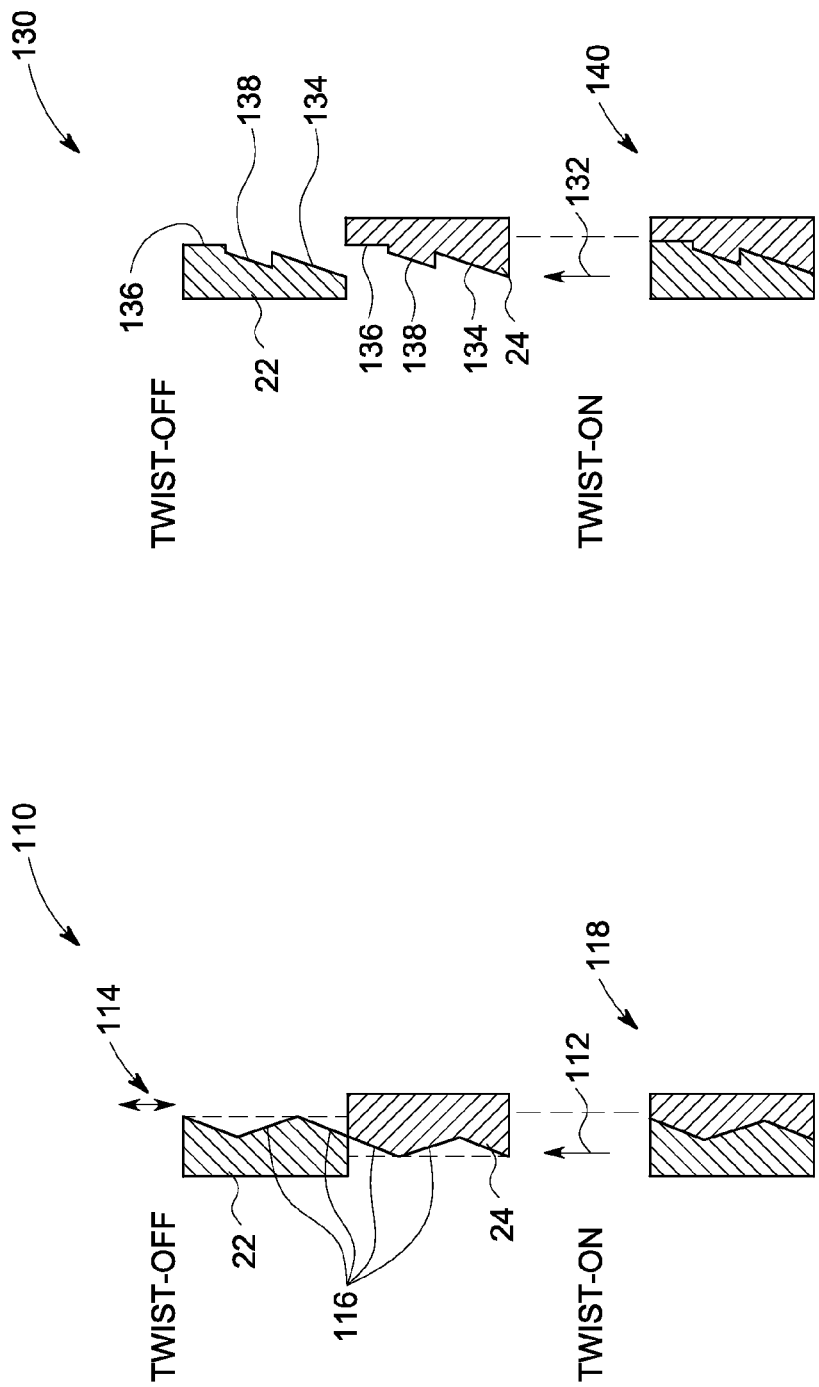

QUICK CONNECT LOBED FASTENER SYSTEM

BACKGROUND

The invention relates generally to lobed connectors, and more particularly to lobed connectors in aircraft engine systems.

Aircraft maintenance is an essential component of a system in the aviation industry. With a continuing increase in air traffic and stringent requirements for commercial schedules, pressure on maintenance operations for higher on-time performance is escalating. The ease of maintaining the aircraft and aircraft reliability can lead to a significant reduction in the overall downtime. Moreover, an easier process of assembly and disassembly of components is also an important factor in facilitating easier maintenance. An improvement in these factors results in enhanced productivity.

There are innumerable hardware components that are interconnected in an aircraft engine assembly. An optimal design of a hardware component assembly that includes several connectors is essential for a high quality performance of the engine. Such a design would help in easier assembly and disassembly resulting in easier servicing.

Among the several hardware components used, brackets are essential components in an aircraft engine that connect critical hardware such as pipes, hoses and sensors to the aircraft engine. For this reason among others, a tight fitting of the brackets is highly desirable. The brackets have to be bolted tightly enough to avoid any movement due to any vibratory or mechanical forces. Typical hardware used for attaching brackets to an aircraft engine are nuts, nut plates welded to brackets, bolts and washers, all made of metal. It would be desirable to utilize plastic brackets due to their weight savings, but plastic brackets would be sensitive to the bolting torque as they could crack if over-torqued.

Therefore, it would be desirable to design a connector that addresses the aforementioned problems.

BRIEF DESCRIPTION

In accordance with one aspect of the invention, a connector for a bracket is provided. The connector includes a stiff male adapter disposed on a surface to be clamped including a first base structure and a neck structure protruding out of the said base structure. The neck structure includes a plurality of first lobes extending radially outward from the neck structure. The plurality of first lobes further includes a first mating surface contour on a bottom surface. The connector also includes a flexible female adapter. The female adapter includes a second base structure that includes a plurality of second lobes made of a flexible material, extending radially inward from the second base structure having a second mating surface contour on a top surface. The second mating surface contour is configured to fit into the first mating surface contour thereby deforming the plurality of second lobes to induce a clamping force between a shoulder of the female adapter and a surface of the bracket.

In accordance with another aspect of the invention, an aircraft engine system is included. The aircraft engine system includes a surface of the aircraft engine configured to connect to a stiff male adapter that includes a first base structure and a neck structure protruding out of the base structure. The neck structure includes a plurality of first lobes extending radially outward from the neck structure. The plurality of first lobes also includes a first mating surface contour on a bottom surface. The aircraft engine system also includes a surface of a bracket configured to connect to the surface of the aircraft engine via a flexible female adapter including a second base structure. The second base structure includes a plurality of second lobes extending radially inward from the second base structure having a second mating surface contour on a top surface. The second mating surface contour is configured to fit into the first mating surface contour thereby deforming the second lobes to induce a clamping force between a shoulder of the female adapter and the surface of the bracket.

DRAWINGS

These and other features, aspects, and advantages of the present invention will become better understood when the following detailed description is read with reference to the accompanying drawings in which like characters represent like parts throughout the drawings, wherein:

FIG. 8 is a diagrammatic illustration of a two way release configuration of the male adapter and the female adapter in FIG. 1 in accordance with an embodiment of the invention; and FIG. 9 is a diagrammatic illustration of a no way release configuration of the male adapter and the female adapter in FIG. 1 in accordance with an embodiment of the invention.

DETAILED DESCRIPTION

As discussed in detail below, embodiments of the present invention include an improved connection system, wherein the connection system provides a boltless and flangeless mechanism of connecting objects such as brackets with desirable clamping force. The connection system includes a twist-on mechanism during assembly and twist-off mechanism during disassembly of the objects that makes it convenient for usage.

Figure 1:
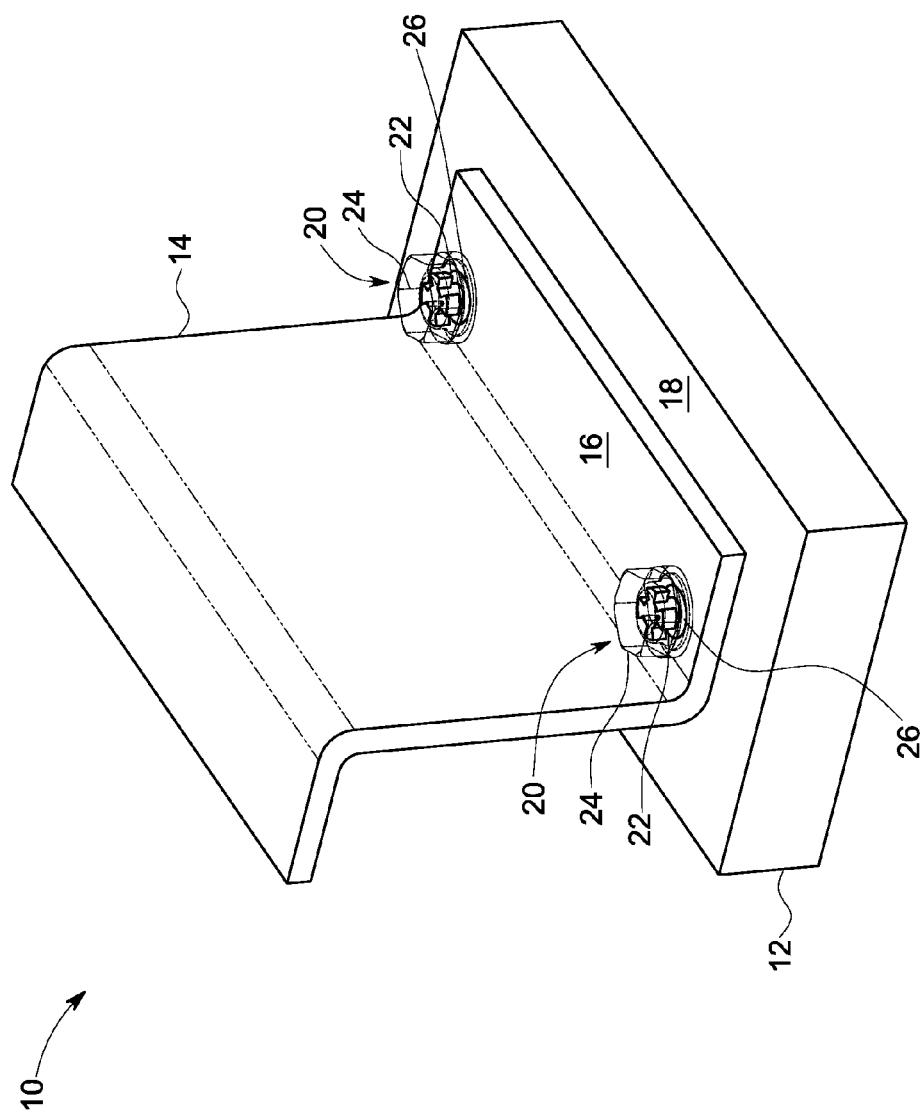
FIG. 1 is a diagrammatic illustration of an exemplary aircraft engine system with a bracket connected in accordance with an embodiment of the invention.

In an illustrated embodiment of the invention as shown in FIG. 1, a diagrammatical illustration of a connection system 10 for an aircraft engine is shown. The system 10 includes a part 12 that is clamped to a bracket 14. In a particular embodiment, the part 12 may be a part of an aircraft engine. A surface 16 of the bracket 14 is attached to a surface 18 of the aircraft engine via a connector 20. The connector 20 includes a male adapter 22 and a female adapter 24. The bracket 14 may include holes 26 large enough so as to slip over the male adapter 22. The female adapter 24 is made up of a flexible material that is deformed by the male adapter 22 enough to induce a clamping force onto the bracket 14 enabling a desirably tight connection. The male adapter 22 may be fitted inside the part 12 so as to enable desirable clearance outside. In an example, the male adapter 22 may be threaded and screwed onto the aircraft engine part 12.

Figure 2:
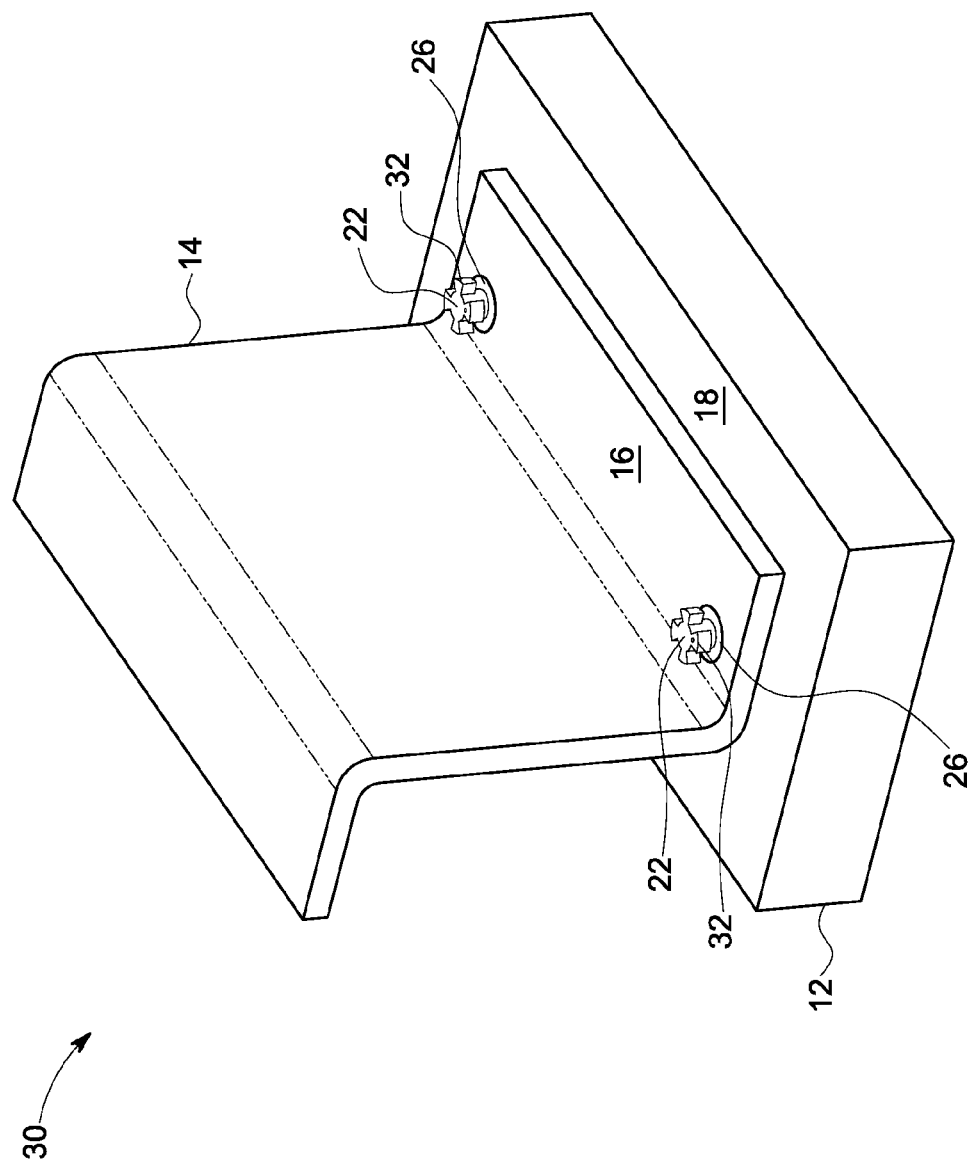
FIG. 2 is a diagrammatic illustration of the bracket in FIG. 1 prior to connection in accordance with an embodiment of the invention.

FIG. 2 is a diagrammatical illustration of the connection system 30 before the female adapter 24 as referenced in FIG. 1 is twisted on. A part 12 as referenced in FIG. 1 may be attached to a surface 16 of a bracket 14 as referenced in FIG. 1 via a male adapter 22. The male adapter 22 may be attached to a surface 18 of the aircraft engine 12. It may also include at least one lobe 32 extending out. The bracket 14 may include holes 26 large enough so as to slip over the male adapter 22.

Figure 3:
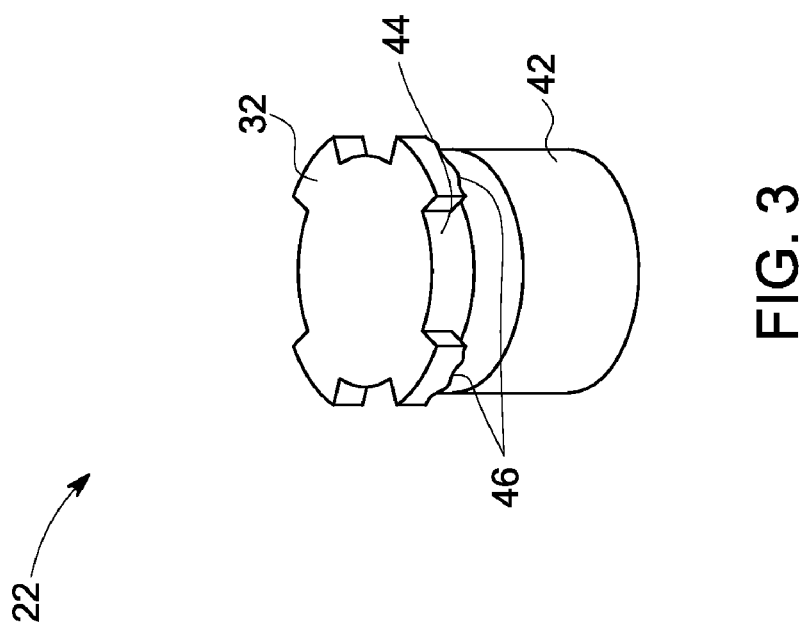
FIG. 3 is a diagrammatic illustration of the male adapter in FIG. 1 in accordance with an embodiment of the invention.

FIG. 3 is a diagrammatical illustration of an exemplary embodiment of the male adapter 22 as referenced to in FIG. 1. The male adapter 22 includes a first base structure 42 and a neck structure 44 that protrudes out of the first base structure 42. The neck structure 44 includes a plurality of first lobes 32 as referenced in FIG. 2 that extend radially outward from the neck structure 44. Each of the first lobes 32 includes a first mating surface contour on a bottom surface 46. The lobes 32 are circumferential flange sections internal to the male adapter 22. In an example, the neck structure 44 may include a hollow circular structure. In another example, the first base structure 42 may include a hollow circular structure. The male adapter 22 may be made up of a material with high strength such as a metal. In a specific embodiment, the male adapter 22 may be made up of steel.

Figure 4:
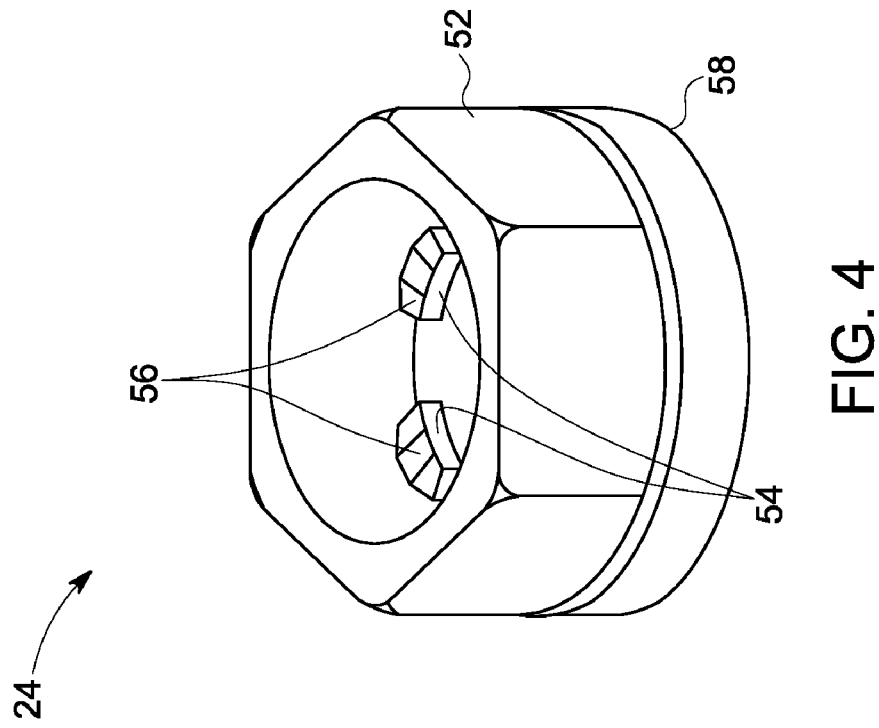
FIG. 4 is a diagrammatic illustration of the female adapter in FIG. 1 in accordance with an embodiment of the invention.

FIG. 4 is a diagrammatical illustration of an exemplary embodiment of the female adapter 24 as referenced to in FIG. 1. The female adapter 24 includes a second base structure 52 that includes a plurality of second lobes 54 extending radially inward from the second base structure 52. Each of the multiple second lobes 54 include a second mating surface contour on a top surface 56 that is configured to fit into the first mating surface contour of the bottom surface 46 in the male adapter 22 in FIG. 3. In an example, the second base structure 52 may include a hexagonal structure. The female adapter 24 may be made up of a flexible material of lesser strength than the male adapter 22 such that the plurality of second lobes 54 may be deformed resulting in a clamping force on a shoulder 58 of the female adapter 24. In a particular embodiment, the female adapter may be made of plastic.

During coupling of the male adapter 22 with the female adapter 24, the first mating surface contour on the bottom surface 46 of the male adapter 22 is configured to twist on and twist off the second mating surface contour on the top surface 56 of the female adapter 24 in specific directions. While twisting on the plurality of first lobes 32 of the male adapter 22 against the plurality of second lobes 54 of the female adapter 24, the flexibility of the second lobes 54 leads to their deformation. The deformation produces a clamping force between a shoulder 58 of the female adapter 24 and the surface 16 of the bracket 14 as referenced in FIG. 1. Special contouring of the bottom surface 36 of the male adapter 16 in FIG. 2 and the top surface 44 of the female adapter 18 deforms the plurality of second lobes 54 desirably enough to enable required bonding at joints. Various embodiments of contouring of the bottom surface 46 and the top surface 56 are described in detail below in FIGS. 6, 7, 8 and 9.

Figure 5:
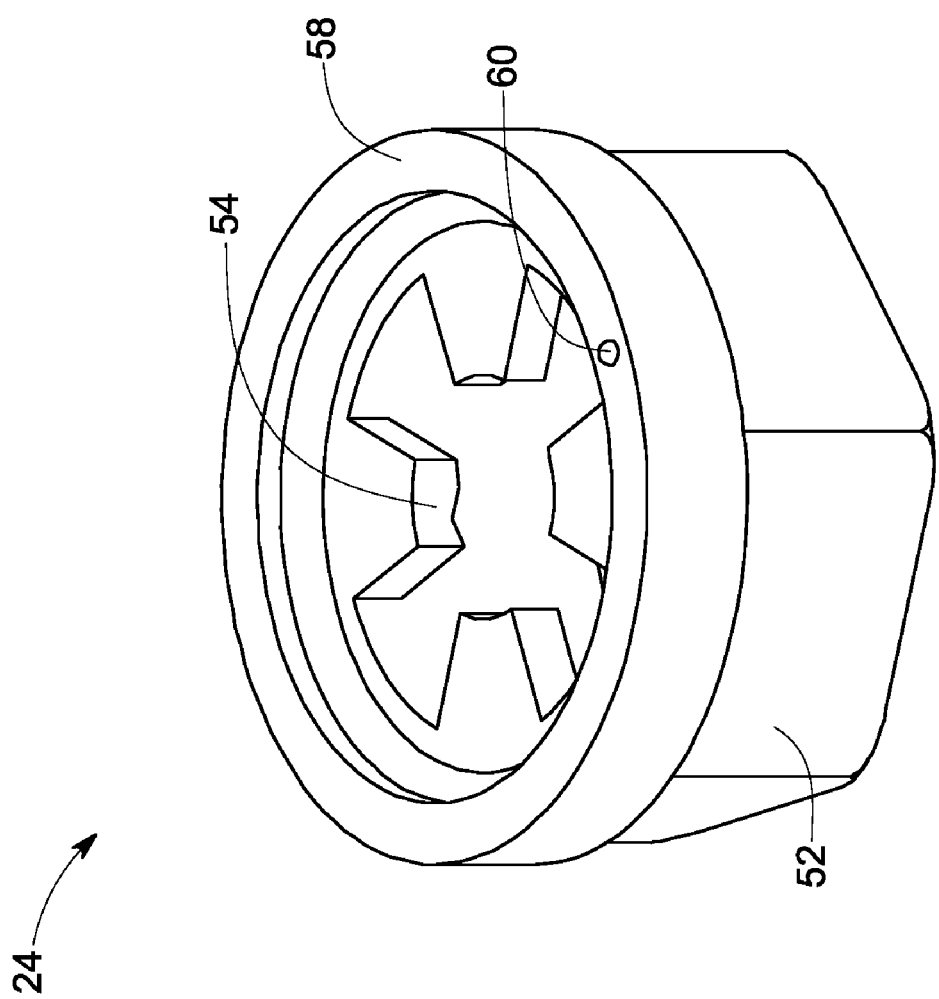
FIG. 5 is a diagrammatic illustration of a hemispherical pip located on the shoulder of the female adapter as another possible means of locking the connector.

FIG. 5 is a diagrammatic illustration of the female adapter 24 as referenced to in FIG. 1, showing a hemispherical pip 60 located on the shoulder 58 of the female adapter as another possible means of locking the male connector 22 as referenced in FIG. 3. For such a locking mechanism a matching hemispherical hole may be machined on the surface 16 as referenced in FIG. 1 of the bracket 14 in FIG. 1.

Figure 6:
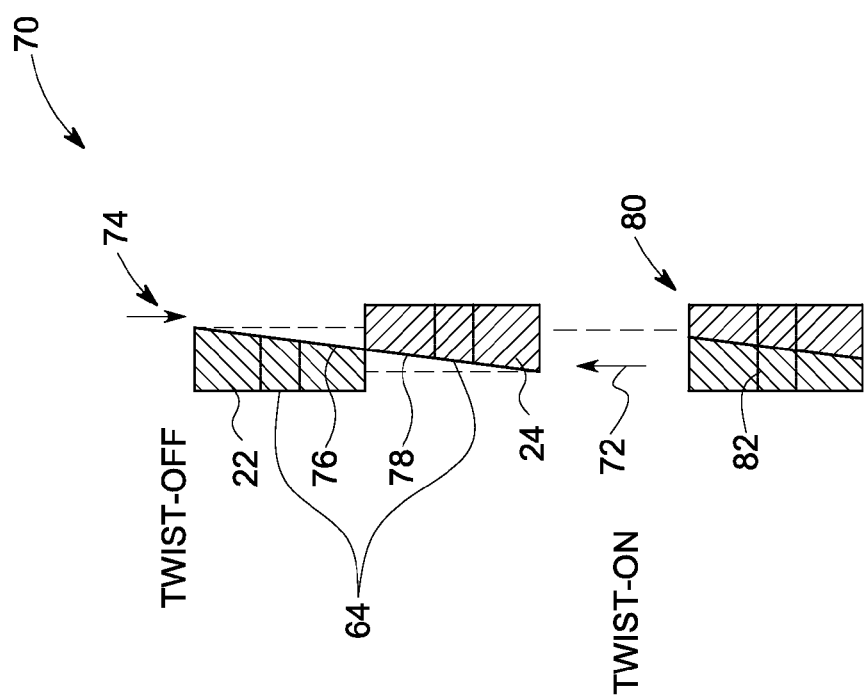
FIG. 6 is a diagrammatic illustration of a dowel stop configuration of the male adapter and the female adapter in FIG. 1 in accordance with an embodiment of the invention.

In an illustrated embodiment of the invention as shown in FIG. 6, an exemplary configuration of the first mating surface contour on the bottom surface 46 of the male adapter 22 in FIG. 3 and the second mating surface contour on the top surface 56 of the female adapter 24 in FIG. 4 is provided. The exemplary configuration 70 is referred to as a dowel stop configuration. In the dowel stop configuration 70, the bottom surface 46 as referenced to in FIG. 3 of the male adapter 22 is twisted on in a direction 72 and twisted off in an opposite direction 74. In the dowel stop configuration 70, the first mating surface contour of the male adapter 22 and the second mating surface contour of the female adapter includes inclined planes 76 and 78 respectively. When the inclined planes 76 and 78 of the first mating surface contour and the second mating surface contour respectively, are aligned, the male adapter 22 and the female adapter 24 are in an unstable position. Hence, a dowel pinhole 82 is required in both the inclined planes 76 and 78 such that a dowel pin may be inserted to hold the male adapter 22 and the female adapter 24 together. The flexibility of the plurality of second lobes 54 as referenced in FIG. 4 of the female adapter 24 produces a desirable clamping force to ensure a tight bond between the male adapter 22 and the female adapter 24 when twisted on as shown in a twist on configuration 80.

Figure 7:
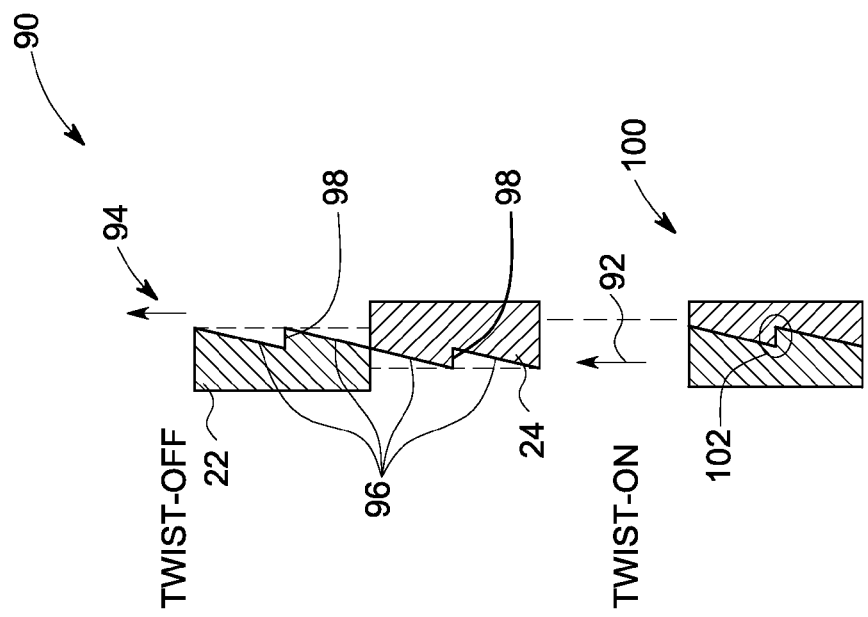
FIG. 7 is a diagrammatic illustration of a ratchet stop configuration of the male adapter and the female adapter in FIG. 1 in accordance with an embodiment of the invention.

In another illustrated embodiment of the invention as shown in FIG. 7, an exemplary configuration of the first mating surface contour on the bottom surface 46 of the male adapter 22 in FIG. 3 and the second mating surface contour on the top surface 56 of the female adapter 24 in FIG. 4 is provided. The exemplary configuration 90 is referred to as a ratchet stop configuration. In the ratchet stop configuration 90, the bottom surface 46 as referenced to in FIG. 3 of the male adapter 22 as referenced to in FIG. 1 are twisted on in a direction 92 and twisted off in the same direction 92. In the ratchet stop configuration 90, the first mating surface contour of the male adapter 22 and the second mating surface contour of the female adapter 24 include two inclined planes 96 and a step 98 between the inclined planes 96. The step 98 allows twisting off the male adapter 22 in only one direction 94. During twist on, as the second mating surface contour of the female adapter 24 encounters the step 98 of the male adapter 22, the female adapter 24 falls in place and gets locked. If the female adapter 24 is further twisted in the same direction 92, it gets unlocked. However, there is no unlocking if twisted in an opposite direction. The flexibility of the plurality of second lobes 54 as referenced in FIG. 4 facilitates in providing a tight bond between the male adapter 22 and the female adapter 24 when twisted on as seen in a twist on configuration 100.

In another illustrated embodiment of the invention as shown in FIG. 8, an exemplary configuration 110 of the first mating surface contour on the bottom surface 46 of the male adapter 22 in FIG. 3 and the second mating surface contour on the top surface 56 of the female adapter 24 in FIG. 4 is provided. The exemplary configuration 110 is referred to as a two way release configuration. In the two way release configuration 110, the bottom surface 46 as referenced to in FIG. 3 of the male adapter 22 as referenced to in FIG. 1 may be twisted on in a direction 112 and twisted off in either direction 112 or 114. In the two way release configuration 110, the first mating surface contour of the male adapter 22 and the second mating surface contour of the female adapter includes three inclined planes 116. The three inclined planes 116 do not prevent twisting off in either direction, as there is no barrier like the step 98 in FIG. 6. Slope of the inclined planes 98 is directly proportional to torque applied during twisting on of the male adapter 22 and the female adapter. Hence, a gentler slope may be designed for an easier twist on process. The flexibility of the plurality of second lobes 54 as referenced in FIG. 4 facilitates in providing a tight bond between the male adapter 22 and the female adapter 24 when twisted on as seen in a twist on configuration 118.

In another illustrated embodiment of the invention as shown in FIG. 9, an exemplary configuration 130 of the first mating surface contour on the bottom surface 46 of the male adapter 22 in FIG. 3 and the second mating surface contour on the top surface 56 of the female adapter 24 in FIG. 4 is provided. The exemplary configuration 130 is referred to as a no way release configuration. In the no way release configuration 130, the bottom surface 46 as referenced to in FIG. 3 of the male adapter 22 as referenced to in FIG. 1 may be twisted on in a direction 132 and is subsequently prevented from twisting off in any direction. In the no way release configuration 130, the first mating surface contour of the male adapter 22 and the second mating surface contour of the female adapter 24 include an inclined plane 134, a straight plane 136 and a step 138 between the inclined plane 134 and the straight plane 136. The step 138 acts as a stop lock that locks the male adapter 22 and the female adapter 24 in place and does not give any degree of freedom to be twisted off. Hence, when the inclined planes 134 of the male adapter 22 and the female adapter 24 align, the step 138 locks the male adapter and the female adapter thus preventing them from twisting off. The flexibility of the plurality of second lobes 54 as referenced in FIG. 4 facilitates in providing a tight bond between the male adapter 22 and the female adapter 24 when twisted on as seen in a twist on configuration 140.

Some of the non-limiting advantages of the above mentioned connection system are non-inclusion of bolts and nuts to join brackets to various parts in a system. In addition, the aforementioned embodiments of the invention include inexpensive flexible material such as plastic that twist on and off without a torquing requirement thus enabling an easier process of assembly and disassembly.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A connector for a bracket comprising:
   a male adapter disposed on a surface to be clamped comprising a first base structure and a neck structure protruding out of the said base structure, said neck structure comprising a plurality of first lobes extending radially outward from the said neck structure, wherein said plurality of first lobes comprise a first mating surface contour on a bottom surface; and
   a female adapter comprising a second base structure, said second base structure comprising a plurality of second lobes made of a flexible material, extending radially inward from the said second base structure having a second mating surface contour on a top surface, wherein said second mating surface contour is configured to fit into said first mating surface contour thereby deforming said plurality of second lobes to induce a clamping force between a shoulder of said female adapter and a surface of the bracket, wherein
   the first mating surface contour and the second mating surface contour comprise an inclined plane, a straight plane and a step between the inclined plane and the straight plane to form a no way release configuration, wherein the bottom surface of the male adapter is twisted on in a direction and is subsequently prevented from twisting off in any direction.

2. The connector of claim 1, wherein said first mating surface contour comprises a dowel stop configured to twist on in one direction and twist off in an opposite direction.

3. The connector of claim 1, wherein said second mating surface contour comprises a dowel stop configured to twist on in one direction and twist off in an opposite direction.

4. The connector of claim 1, wherein said first mating surface contour comprises a ratchet stop configured to twist on in a direction and twist off in the same direction.

5. The connector of claim 1, wherein said second mating surface contour comprises a ratchet stop configured to twist on in a direction and twist off in the same direction.

6. The connector of claim 1, wherein said first mating surface contour comprises a two way release stop configured to twist on in a direction and twist off in either the same direction or an opposite direction.

7. The connector of claim 1, wherein said second mating surface contour comprises a two way release stop configured to twist on in a direction and twist off in either the same direction or an opposite direction.

8. The connector of claim 1, wherein said shoulder of said female adapter comprises a hemispherical pip, the hemispherical pip comprising a release stop.

9. The connector of claim 1, wherein said neck structure of the male adapter comprises a hollow annular structure.

10. The connector of claim 1, wherein said second base structure of the female adapter comprises a hollow annular structure.

11. The connector of claim 1, wherein said female adapter is made of plastic.

\* \* \* \* \*